(12) United States Patent
Teranishi et al.

(10) Patent No.: US 7,555,353 B2
(45) Date of Patent: Jun. 30, 2009

(54) INPUT DEVICE OF SAFETY UNIT

(75) Inventors: Keiichi Teranishi, Numazu (JP); Yasuo Muneta, Kusatsu (JP); Chiaki Koshiro, Yokohama (JP); Naoaki Ikeno, Kusatsu (JP); Toshiyuki Nakamura, Ritto (JP); Hiromu Suganuma, Ohtsu (JP); Asahi Matsui, Tokyo (JP); Katsufumi Yoshida, Kusatsu (JP); Shohei Fujiwara, Ohtsu (JP); Takehiko Hioka, Ritto (JP)

(73) Assignee: Omron Corporation, Kyoto-Shi (JP)

( * ) Notice: Subject to any disclaimer, the term of this patent is extended or adjusted under 35 U.S.C. 154(b) by 336 days.

(21) Appl. No.: 11/405,704

(22) Filed: Apr. 18, 2006

(65) Prior Publication Data

US 2006/0271833 A1 Nov. 30, 2006

(30) Foreign Application Priority Data

Apr. 19, 2005 (JP) .......................... P2005-121673
Mar. 31, 2006 (JP) .......................... P2006-097197

(51) Int. Cl.
G06F 19/00 (2006.01)
(52) U.S. Cl. .................. 700/3; 700/2; 700/5; 700/21; 700/26; 700/79; 700/81; 714/11
(58) Field of Classification Search .................. 700/2–3, 700/5, 21, 26, 79, 81; 714/11
See application file for complete search history.

(56) References Cited

U.S. PATENT DOCUMENTS 6,201,997 B1 * 3/2001 Giers .......................... 700/79
6,711,713 B1 * 3/2004 Rumpler et al. ............. 714/820
6,999,824 B2 * 2/2006 Glanzer et al. ................ 700/18
7,120,505 B2   10/2006 Nakamura et al.
7,269,465 B2 * 9/2007 Esch et al. .................... 700/21
7,287,184 B2 * 10/2007 Gibart et al. ................... 714/11
2004/0008467 A1* 1/2004 Calandre et al. ............. 361/119
2004/0081079 A1* 4/2004 Forest et al. ................. 370/216
2004/0081193 A1* 4/2004 Forest et al. ................. 370/458

FOREIGN PATENT DOCUMENTS

| EP | 1 396 771 | 3/2004 |
| EP | 1 404 061 | 3/2004 |
| EP | 1 406 134 | 4/2004 |
| EP | 1 460 497 | 9/2004 |
| FR | 2 681 160 | 3/1993 |
| JP | 11-073201 | 3/1999 |
| JP | 2004-297997 | 10/2004 |
| WO | WO-03/001306 | 1/2003 |

* cited by examiner

Primary Examiner—Michael D Masinick
(74) Attorney, Agent, or Firm—Foley & Lardner LLP

(57) ABSTRACT

This invention provides an input device of safety unit which enables an error diagnosis result referred to in a process of input processing for generating a control data from raw input signal to be referred by a side using the control data also in a safety unit such as a safety master and safety slave. An input device contains a function of outputting status data indicating the error diagnosis result referred to when input signal is converted to control data and the control data obtained by the conversion in pair, so that when the logical value of the control data is "LOW", whether it originates from that the raw logical value is "LOW" or that "LOW" is compulsorily set due to an error in the terminal can be determined from the logical value of the status data.

3 Claims, 11 Drawing Sheets

INPUT DEVICE OF SAFETY UNIT

CROSS-REFERENCE TO RELATED PATENT APPLICATIONS

Japanese Priority Applications P2005-121673, filed Apr. 19, 2005 and P2006-097197, filed Mar. 31, 2006, including the specification, drawings, claims and abstract, are incorporated herein by reference in their entirety

BACKGROUND OF THE INVENTION

1. Field of the Invention

The present invention relates to an input device of a safety unit preferable as an input means of the safety unit such as a safety controller and remote safety terminal.

2. Description of the Related Art

A variety of the safety controllers have been developed with currently intensified consciousness to work safety. The safety controller secures a high reliability by incorporating self-diagnostic function for the safety in addition to logic arithmetic operating function similar to general programmable controller (PLC) and I/O control function. This safety controller has a function of controlling the safety side compulsorily so as to prevent its own control from leading to a danger if an abnormality is detected as a result of the self-diagnosis. More specifically, the safety mentioned here includes specified safety standard. The standard includes for example, IEC61508, EN standard and the like. The IEC61508 (International Electrotechnical Commission concerning programmable electronic system functional safety) has defined danger fault probability per hour (probability of failure per hour) and classified the safety integrity level (SIL) to four stages depending on this probability. The EN standard evaluates the seriousness of risk of machine and obligates to take a risk reducing measure and the EN954-1 stipulates five safety categories. The safety controller of the present invention meets any one of these safety standards.

Since before, a safety control system in which a safety controller 2 and a safety slave 1 are connected with a network 3 as shown in FIG. 11 has been well known. The safety slave 1 secures a high reliability by incorporating self-diagnostic function for both input and output in addition to the same function as a slave in an ordinary PLC. The safety controller 2 has communication master function of executing communication with the safety slave 1 through network and is sometimes called safety master. The safety slave 1 is sometimes called remote safety terminal and has a function of network communication (slave function controlled by master) with the communication master function of the safety controller 2. The safety slave has a connection terminal and at least one of an input device such as a switch for outputting ON/OFF signal and an output device which acts as an output destination of the control signal is connected to that connection terminal (although FIG. 11 shows an example of the input device while an emergency stop switch SW is connected thereto, light curtain, door switch, 2-hand switch and the like can be connected. Representation of the output device is omitted. The output device includes safety relay, contactor and the like). These input devices and output devices meet the safety standards. The safety slave generates control data based on a signal inputted from a connected safety application device and transmits the generated control data to the safety controller through network. The safety slave receives the control data from the safety controller by communicating with the safety controller through network. Then, the safety controller 2 receives an input signal from an input device inputted from the safety slave 1 through network communication, executes logical operation of ON/OFF of the input signal according to a preliminarily stored logic program and outputs an output signal based on a result of the logical operation to the safety slave 1 through network communication. The safety slave outputs the output signal to an output device. As a result of executing such a series of the operations repeatedly, the safety controller controls the entire system. The communication cycle between the safety controller 2 and the safety slave 1 may be synchronous with repetitive execution cycle of the safety controller or may be asynchronous. The output device is connected to an operating robot, processing machine, cutting tool or the like and when the safety relay of the output device or a contact point of the contactor is ON, the operating robot is actuated and when the contact point is OFF, the operating robot is stopped. The safety controller controls the operating robot or the like as a control object by controlling ON/OFF of the output device. That is, if the safety controller 2 is notified that the emergency stop switch SW is operated properly when controlling a control object (not shown) by the safety slave through communication, it turns OFF the output device or controls the status to the safety side compulsorily in order to prevent the control object from taking a dangerous action so as to take a necessary safety measure immediately. Further if the safety controller receives a diagnostic result indicating that the emergency stop switch SW or other input device (not shown) has an error when controlling a control object (not shown), it turns off the output device or controls the status to the safety side compulsorily to stop the operation of the control object in order to prevent the control object from taking a dangerous action regardless of whether the emergency stop switch SW is operated or the input device is turned ON/OFF, so as to take a necessary safety measure immediately.

In the safety control system of master/slave type in which the safety controller is a communication master station and the safety slave is a communication slave station as shown in FIG. 11, if a diagnostic result indicating that an input terminal to which a safety application switch (SW) meeting the safety standard is connected has an error as a result of the operation of the self-diagnostic function of the safety slave 1, some countermeasures are adopted selectively by the safety slave side in order to secure the safety of operation on the safety master side.

A first countermeasure on the safety slave side is to set the value of control data (input data whose safety is ensured) to be transmitted to the safety master 2 corresponding to the terminal to OFF ("LOW") compulsorily and transmit OFF ("LOW") to the safety controller 2. A second countermeasure is to block erroneous control data from being transmitted to the safety controller by shutting down communication through network.

According to the first countermeasure, if it is diagnosed that the safety application switch (SW) has an error on the safety slave side 1, the value of the control data corresponding to the safety application switch (SW) is compulsorily set to OFF ("LOW") status in the same way as when the safety application switch is pressed and consequently, the side of the safety controller 2 receiving the control data can take a necessary safety measure immediately.

However, according to the first countermeasure, the side of the safety master 2 cannot determine whether when the value of the control data is in OFF ("LOW") status, it is in the OFF ("LOW") status as a result of the safety application switch (SW)'s being pressed actually or it is in OFF ("LOW") status as a result of being compulsorily set to the status because the diagnostic result indicates that an error exists. Therefore, the side of the safety master receiving the control data has such a problem that it cannot take an appropriate countermeasure sufficiently because it takes time and labor to restore the system after that. The reason is that because even if the system is stopped as a result of the emergency stop switch SW's being pressed properly, whether the system is stopped because the emergency stop switch is pressed properly or due to a trouble cannot be automatically determined, it is impossible to discriminate whether nothing but releasing the emergency stop switch is required or it is necessary to check for any error and thus, a necessity of checking occurs each time so that it takes time for system restoration each time when the system stops.

According to the second countermeasure, because the value of the control data is set to OFF ("LOW") status compulsorily because of absence of receiving data on the side of the safety master, the value of the control data corresponding to the safety application switch (SW) on the side of the safety master 2 is set to OFF ("LOW") status compulsorily in the same way as when the safety application switch is pressed by shutting down communication on the side of the safety slave 1, the side of the safety controller 2 can take a necessary safety measure immediately for the system.

However, the second countermeasure has such a problem that a reason cannot be searched for until error history is read out after the system is stopped and that it takes time for system restoration work. The reason is that because it is impossible to automatically determine whether the system is stopped because the emergency stop switch SW is pressed properly or because the system is in trouble, it is impossible to discriminate whether nothing but releasing the emergency stop switch is required or it is necessary to remove a cause for an error in the network and consequently, a necessity of checking each time occurs so that it takes time for system restoration each time the system stops.

SUMMARY OF THE INVENTION

The present invention has been achieved in views of the above-described problems on a conventional safety control system and an object of the invention is to provide an input device of safety unit which enables an error diagnostic result referred by a safety unit such as a safety controller, safety slave in a process of generating control data from raw input signal from a safety application switch or the like to be referred by the controller side using that control data so as to achieve a variety of safety controls based on the control data.

According to a first aspect of the present invention, there is provided a the safety slave unit that with an input device based on safety specification and activated when a danger exists connected thereto, receives a signal about action presence/absence from the input device as an input, handles the signal as an input signal and is connected to a safety controller based on the safety specification through a network so as to transmit the input signal to a communication master on the safety controller side, comprising: an input terminal portion having one or two or more input terminals supplied with an input signal from the input device based on the safety specification; an error diagnostic portion that fetches information of a self-diagnosis result of the input device connected to each input terminal of the input terminal portion individually; and a processing device that handles an error diagnosis result of the error diagnostic portion as status data, regards a logical value about presence or absence of any raw action of the input device, which is an input signal given to the input terminal portion, as indicating presence of action compulsorily if the result of error diagnosis by the error diagnostic portion is presence of an error, while if the result of the error diagnosis by the error diagnostic portion is normal, maintains the logical value about the presence or absence of the raw action, handles the logical value as the control data and transmits the control data and status data in pair to a communication master portion of the safety controller.

The status in which the input device based on safety specification is activated when a danger exists corresponds to ON state in the embodiment or "LOW" in the logical value of the control data. The absence of action corresponds to OFF state in the embodiment or "HIGH" in the logical value of the control data. The network between the safety slave unit and the safety controller is called safety field network.

According to a second aspect of the present invention, there is provided a control system in which a safety controller based on the safety specification having a communication master portion and a safety slave unit for the safety are connected through a network, wherein the safety slave unit comprises: an input terminal portion that has an input terminal and to which an input device based on the safety specification is connected through the input terminal and receives a signal about presence or absence of action from the input device as an input and handles the signal as an input signal; an error diagnostic portion that fetches information of a self-diagnosis result of each input device connected to each input terminal individually; and a processing device that handles an error diagnosis result of the error diagnostic portion as status data, regards a logical value about presence or absence of any raw action of the input device inputted by the input terminal portion as indicating presence of the action compulsorily if the error diagnosis result by the error diagnostic portion is presence of an error, while if the result of the error diagnosis by the error diagnostic portion is normal, maintains the logical value about the presence or absence of the raw action, handles the logical value as the control data and transmits the control data and status data in pair to a communication master portion of the safety controller, wherein the safety controller receives a pair data of the control data and status data from the safety slave through the communication master portion and when the received control data indicates a status about presence of the action, determines whether that status originates from that the raw logical value indicates presence of the action or that the presence of the action is compulsorily induced due to an error, based on the logical values of the control data and status data.

The presence of action of the input device based on safety specification corresponds to ON state in the embodiment or "LOW" in the logical value of the control data. The absence of action corresponds to OFF state in the embodiment or "HIGH" in the logical value of the control data.

According to a third aspect of the present invention, there is provided a safety controller that with an input device based on safety specification and activated when a danger exists, receives a signal about action presence/absence as an input, connects an input unit that handles that signal as an input signal through an internal bus, while the CPU unit inputs an input signal of the input unit, and executes safety logic control based on the input signal, wherein the input unit includes: an input terminal portion having one or two or more input terminals supplied with an input signal from the input device based on the safety specification; an error diagnostic portion that fetches information of a self-diagnosis result of the input device connected to each input terminal of the input terminal portion individually; and a processing device that handles an error diagnosis result of the error diagnostic portion as status data, regards a logical value about presence or absence of any raw action of the input device, which is an input signal given to the input terminal portion, as presence of action compulsorily if the result of error diagnosis by the error diagnostic portion is presence of an error, while if the result of the error diagnosis by the error diagnostic portion is normal, maintains the logical value about the presence or absence of the raw action, handles the logical value as the control data and transmits the control data and status data in pair to the CPU unit through the internal bus and the CPU unit includes a central processing portion that with a pair data of the control data and status data inputted from the input unit, when the inputted control data indicates a status about presence of action, determines whether that status originates from that the raw logical value indicates presence of action or that the presence of the action is compulsorily induced due to an error, based on the logical values of the control data and status data.

According to a fourth aspect of the present invention, there is provided an input device of safety unit comprising: an input terminal portion having one or two or more input terminals supplied with an input signal from an input device based on safety specification; an error diagnostic portion used for diagnosing for presence or absence of an error in each input terminal of the input terminal portion; an error diagnosing device for diagnosing for presence or absence of an error in each input terminal of the input terminal portion using the error diagnosing portion; and an input device that converts an input signal having a raw logical value given to each input terminal of the input terminal portion to control data having a logical value whose safety is guaranteed by reference to a result of error diagnosis with the error diagnosing device.

In the input device contains a function that outputs a status data indicating the error diagnosis result referred to when the input data is converted to the control data and the control data obtained by that conversion in pair.

Thereby, when the logical value of the control data is "LOW", whether it originates from that the raw logical value is "LOW" or that "LOW" is compulsorily set due to an error is capable of being determined from a logical value of the status data making a pair with the control data.

With such a structure, the input device contains a function that outputs the status data indicating the error diagnosis result referred to when the input signal is converted to the control data and the control data obtained by the conversion in pair. As a consequence, the error diagnosis result referred to in the process of input processing for generating the control data from raw input signal can be referred to by a side using that control data thereby achieving a variety of safety controls based on the control data.

The side using the control data mentioned here does not always mean a mate to be connected through communication. For example, if the corresponding safety unit is a safety controller or a remote safety terminal, it is a main processing (user program execution processing, system service processing and the like) inherent of the device to be exerted inside of each.

In a preferred embodiment of the aforementioned input device, the logical value of the status data is "LOW" when an error exists and "HIGH" when no error exists.

With this structure, the logical value of the status data does not turn to "HIGH" indicating absence of an error until it is set to absence of error positively by confirming that no error exists actually, because the logical value indicating absence of error is set to a logical value ("HIGH") on high energy side. As a consequence, the status data obtains a high reliability, so that status data indicating absence of error is prevented from being sent by mistake in a not-diagnosed state just after the power is turned ON.

According to a preferred embodiment, while the input device reflects a raw logical value given to the input terminal on the control data as it is when the result of error diagnosis indicates absence of error, the input device sets the logical value of the control data to "LOW" compulsorily regardless of the raw logical value given to the input terminal.

Such a configuration enables an input signal having raw logical value given to each input terminal of the input terminal portion to be converted to control data having a logical value whose safety is guaranteed by reference to the error diagnosis result by the error diagnostic device.

According to a fifth aspect of the present invention, there is provided a safety slave unit comprising: an input terminal portion having one or two or more input terminals supplied with an input signal from an input device based on safety specification; an error diagnostic portion used for diagnosing for presence or absence of an error in each input terminal of the input terminal portion; an error diagnosing device for diagnosing for presence or absence of an error in each input terminal of the input terminal portion using the error diagnosing portion; and an input device that converts an input signal having a raw logical value given to each input terminal of the input terminal portion to control data having a logical value whose safety is guaranteed by reference to a result of error diagnosis with the error diagnosing device, and outputs the control data obtained by that conversion with status data indicating the error diagnosis result referred to upon the conversion in pair to the network; and a transmitting device for transmitting the control data obtained from the input device with the status data making a pair therewith to the network, wherein the mate of the transmission through the network is capable of determining whether, when the logical value of the received control data is "LOW", it originates from that the raw logical value is "LOW" or that "LOW" is compulsorily set due to an error in the terminal from a logical value of the status data making a pair with the control data.

With such a configuration, the input device contains a function that outputs the status data indicating the error diagnosis result referred to when the input signal is converted to the control data with the control data obtained by the conversion in pair. As a consequence, the error diagnosis result referred to in the process of the input processing for generating the control data from a raw input signal can be referred to by a side using the control data (for example, safety master connected through network or the like), so that a variety of safety controls based on the control data can be achieved on the receiving side through the network.

According to a preferred embodiment, the logical value of the status data is "LOW" when an error exists and "HIGH" when no error exists.

With this structure, the logical value of the status data does not turn to "HIGH" indicating absence of an error until it is set to absence of error positively by confirming that no error exists actually, because the logical value indicating absence of error is set to a logical value ("HIGH") on high energy side. As a consequence, the status data obtains a high reliability, so that status data indicating absence of error is prevented from being sent to a mate of transmission (for example, safety master connected through network or the like) by mistake in a not-diagnosed state just after the power is turned ON.

According to a preferred embodiment, while the input device reflects a raw logical value given to the input terminal on the control data as it is when the result of error diagnosis indicates absence of error, the input device sets the logical value of the control data to "LOW" compulsorily regardless of the raw logical value given to the input terminal.

Such a configuration enables an input signal having a raw logical value given to each input terminal of the input terminal portion to be converted to control data having a logical value whose safety is guaranteed by reference to the error diagnosis result by the error diagnostic device and outputted. As a consequence, a mate of transmission (safety master or the like) connected through communication can take an appropriate safety measure by sending this to the mate.

According to a sixth aspect of the present invention, there is provided a safety controller comprising: an input terminal portion having one or two or more input terminals supplied with an input signal from an input device based on safety specification; an error diagnostic portion used for diagnosing for presence or absence of an error in each input terminal of the input terminal portion; an error diagnosing device for diagnosing for presence or absence of an error in each input terminal of the input terminal portion using the error diagnosing portion; and an input device that converts an input signal having a raw logical value given to each input terminal of the input terminal portion to control data having a logical value whose safety is guaranteed by reference to a result of error diagnosis with the error diagnosing device, and outputs the control data obtained by that conversion with status data indicating the error diagnosis result referred to upon the conversion in pair to the network; and a transmitting device for transmitting the control data obtained from the input device with the status data making a pair therewith to the network, wherein the mate of the transmission through the network is capable of determining whether, when the logical value of the received control data is "LOW", it originates from that the raw logical value is "LOW" or that "LOW" is compulsorily set due to an error in the terminal from a logical value of the status data making a pair with the control data.

With such a configuration, the input device contains a function that outputs the status data indicating the error diagnosis result referred to when the input signal is converted to the control data with the control data obtained by the conversion in pair. As a consequence, the error diagnosis result referred to in the process of the input processing for generating the control data from a raw input signal can be referred to by a side using the control data (for example, safety master connected through network or the like), so that a variety of safety controls based on the control data can be achieved on the receiving side through the network.

According to a preferred embodiment, the logical value of the status data is "LOW" when an error exists and "HIGH" when no error exists.

With this structure, the logical value of the status data does not turn to "HIGH" indicating absence of an error until it is set to absence of error positively by confirming that no error exists actually, because the logical value indicating absence of error is set to a logical value ("HIGH") on high energy side. As a consequence, the status data obtains a high reliability, so that status data indicating absence of error is prevented from being sent to a mate of transmission (for example, safety master connected through network or the like) by mistake in a not-diagnosed state just after the power is turned ON.

According to a preferred embodiment, while the input device reflects a raw logical value given to the input terminal on the control data as it is when the result of error diagnosis indicates absence of error, the input device sets the logical value of the control data to "LOW" compulsorily regardless of the raw logical value given to the input terminal.

Such a configuration enables an input signal having a raw logical value given to each input terminal of the input terminal portion to be converted to control data having a logical value whose safety is guaranteed by reference to the error diagnosis result by the error diagnostic device and outputted. As a consequence, a mate of transmission (safety master or the like) connected through communication can take an appropriate safety measure by sending this to the mate.

According to a seventh aspect of the present invention, there is provided a safety control system in which a safety controller functioning as a safety master and a remote safety unit functioning as a safety slave are connected through a network, wherein the remote safety unit comprising an input terminal portion having one or two or more input terminals supplied with an input signal from an input device based on safety specification; an error diagnostic portion used for diagnosing for presence or absence of an error in each input terminal of the input terminal portion; an error diagnosing device for diagnosing for presence or absence of an error in each input terminal of the input terminal portion using the error diagnosing portion; and an input device that converts an input signal having a raw logical value given to each input terminal of the input terminal portion to control data having a logical value whose safety is guaranteed by reference to a result of error diagnosis with the error diagnosing device, and outputs the control data obtained by that conversion with status data indicating the error diagnosis result referred to upon the conversion in pair to the network; and a transmitting device for transmitting the control data obtained from the input device with the status data making a pair therewith to the network, wherein the safety controller includes a receiving device for receiving control data and status data making a pair therewith from network and an input data reproducing device for reproducing input data based on the control data and the status data making a pair therewith.

With such a configuration, the remote safety unit side is provided with a transmitting device having a function for transmitting the control data obtained from the input device and the status data making a pair therewith to the network and on the other hand, the safety controller side is provided with a receiving device for receiving the control data and the status data making a pair therewith from the network and an input data reproducing device for reproducing input data based on the control data and the status data making a pair therewith. As a consequence, the diagnosis result of the remote safety unit side can be used effectively on the safety control side, thereby achieving more reliable safety control.

As described previously, the logical value of the status data is preferred to be "LOW" when an error exists and "HIGH" when no error exists. Further, preferably, while the input device reflects a raw logical value given to the input terminal on the control data as it is when the result of error diagnosis indicates absence of error, the input device sets the logical value of the control data to "LOW" compulsorily regardless of the raw logical value given to the input terminal.

The present invention enables the error diagnosis result referred to in the process of the input processing for generating the control data from a raw input signal to be referred to on a side using the control data in the safety unit such as the safety master and safety slave thereby achieving a variety of safety controls based on the control data.

DETAILED DESCRIPTION OF THE PREFERRED EMBODIMENTS

Hereinafter, the preferred embodiment of the safety control system of the present invention will be described in detail with reference to the accompanying drawings.

Figure 1:
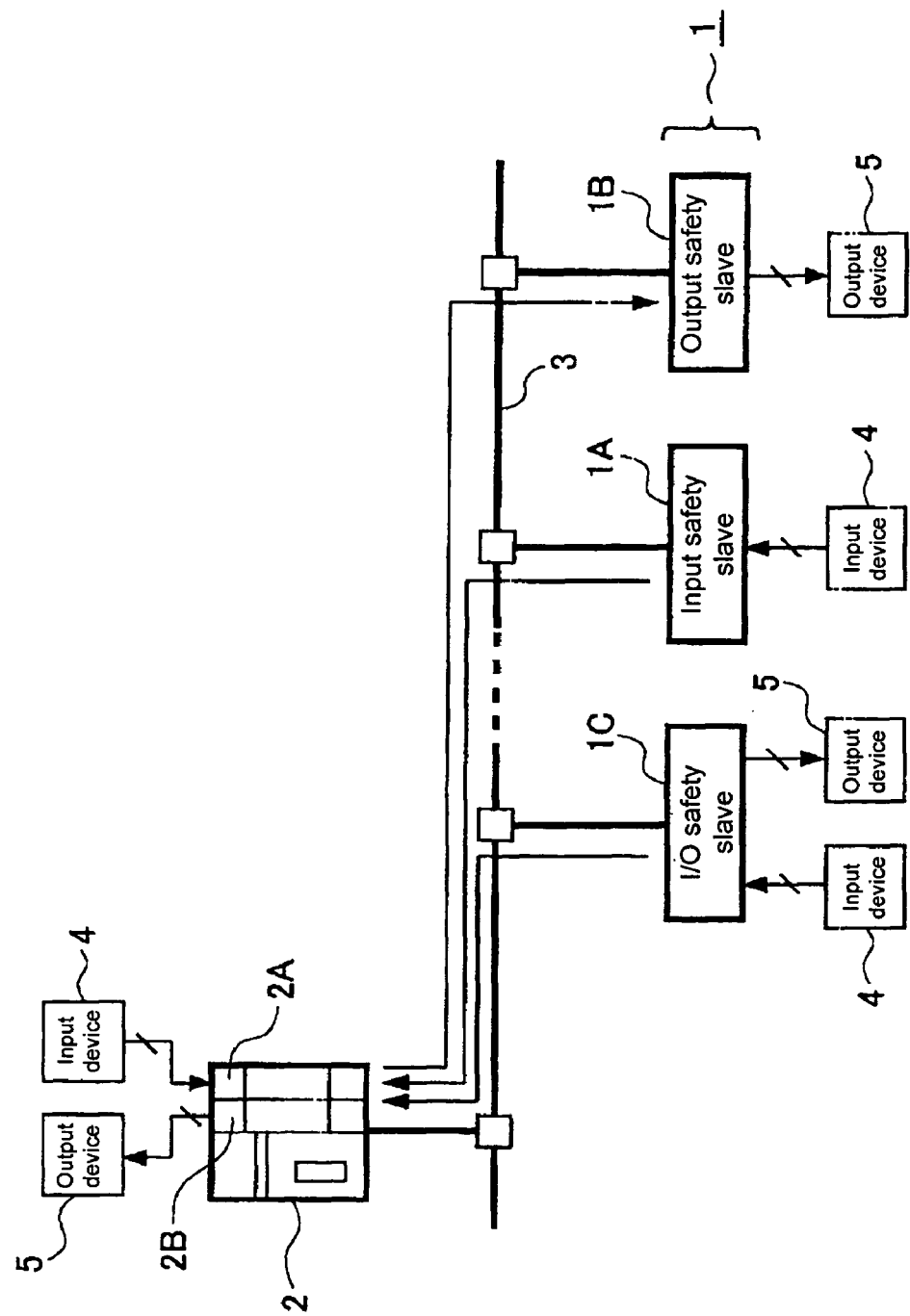
FIG. 1 is a configuration diagram of a safety control system.

FIG. 1 shows a structure diagram of the safety control system of the present invention. As shown in the same Figure, this safety control system is constituted by connecting a plurality of safety slaves 1 with a safety controller 2 through network 3. As the safety slave 1 of this example, an input safety slave 1A, an output safety slave 1B and an I/O safety slave 1C are indicated. Then, an input device 4 is connected to the input safety slave 1A, an output device 5 is connected to the output safety slave 1B and the input device 4 and the output device 5 are connected to the I/O safety slave 1C.

These input device 4 and output device 5 are designed based on safety specification. The input device is, for example, an emergency stop switch, a light curtain, a door switch, or 2-hand switch and the output device is, for example, a safety relay or contactor. These devices are the same as conventional ones.

The input safety slave 1A, the output safety slave 1B and the I/O safety slave 1C have a function of executing communication action to communication master function, a function of executing input action to a connected input device, a function of executing output action to a connected output device and a function of executing self-diagnosis concerning the input and output terminals like a slave unit of an ordinary programmable controller (hereinafter referred to as PLC. In the meantime, an ordinary PLC refers to a controller used for ordinary purpose and does not include a safety controller). The self-diagnostic function provided on each I/O safety slave has a function of diagnosing whether its own input terminal portion has any error and can execute self-diagnosis about various functions such as communication function and self-diagnosis about whether or not wiring between the I/O terminal and the I/O device is short-circuited or broken. As another example, the self-diagnostic function may be a function in which with a different test output terminal from the I/O terminal provided on each I/O safety slave, a signal is sent appropriately from the test output terminal to a corresponding I/O device and whether or not the signal is sent back properly through the corresponding input device is checked so as to monitor whether or not the corresponding input is normal.

The safety controller 2 has a variety of self-diagnostic functions as well as a function similar to a CPU incorporated main body of an ordinary PLC. In this example, the safety controller 2 includes an input unit 2A and an output unit 2B, which are connected to each other. These units are sometimes called local unit. The input unit 2A and output unit 2B are connected to an internal bus of the safety controller so as to execute bus communication with the CPU unit. Then, an input device 4 designed based on safety specification is connected to the input unit 2A and an output device 5 designed base on the safety specification is connected to the output unit 2B.

Figure 2:
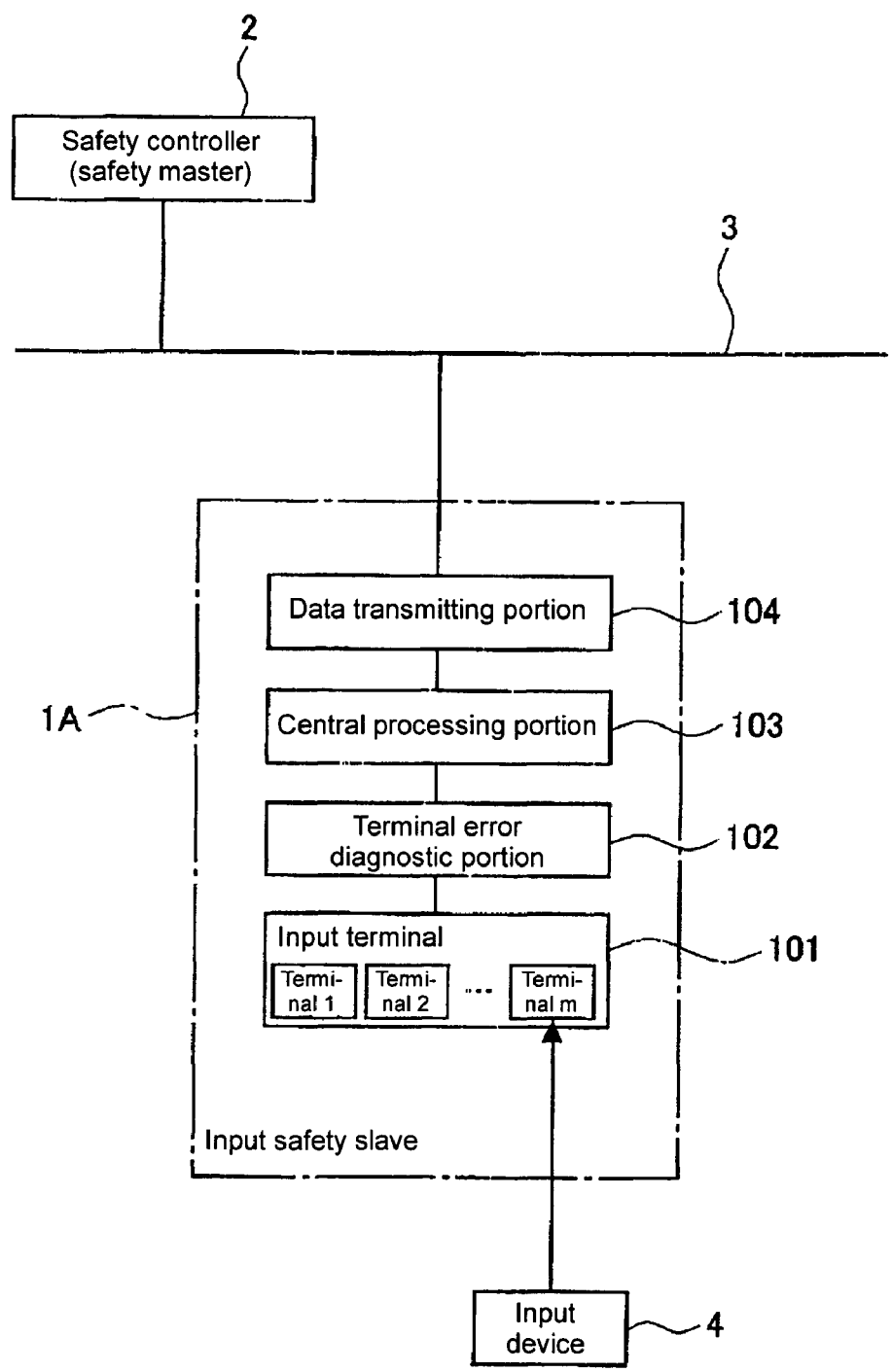
FIG. 2 is a block diagram showing internal hardware structure of the input safety slave.

FIG. 2 shows a block diagram indicating the internal hardware structure of the input safety slave 1A. As shown in the same Figure, the input safety slave 1A includes an input terminal portion 101, a terminal error diagnostic portion 102, a central processing portion 103 and a data transmitting portion 104.

The input terminal portion 101 has one or two or more input terminals (terminal 1, terminal 2, . . . terminal n) to which an input signal is provided from the input device 4 designed based on the safety specification. Each terminal is constituted of one or two or more terminals. The input device is designed on the safety specification and more specifically, the safety application switch is employed. The safety application emergency stop switch is pressed when a dangerous status occurs, so that its contact point is opened to OFF and LOW signal is outputted. To the contrary, in a safety status, this switch is not pressed so that its contact point is closed to output ON signal (HIGH signal). In this way, the safety application switch is designed to output LOW when a dangerous status occurs.

The terminal error diagnostic portion 102 is used to diagnose for presence or absence of an error in each input terminal (terminal 1, terminal 2, . . . terminal n) of the input terminal portion 101 and includes a variety of self-diagnostic circuits as disclosed in, for example, the Japanese Patent Application Laid-Open No. 2004-297997. The errors of each input terminal mentioned here include not only errors in the input devices connected to the terminal but also an error of the terminal and other various errors. The terminal error diagnostic portion 102 may be constructed to diagnose an error in each input device by inputting an abnormality signal as a result of self-diagnosis, if the input device has the self-diagnostic function, through each terminal. Further, the terminal error diagnostic portion 102 may be constructed to diagnose an error in each terminal individually if there is an abnormality in wiring between the terminal and the input device. In conclusion, any structure may be adopted if it can obtain a status of presence or absence of error individually for a terminal of a system. In the meantime, the output safety slave 1B may be constructed to detect a status of presence or absence of error individually for an output terminal of a system. For example, it may be constructed to obtain a self-diagnosis result of an output device itself if the output device has the self-diagnostic function or detect breaking or short-circuit of wiring between the terminal and the output device. The I/O safety slave 1C may be constructed to detect a status of presence or absence of error individually for an input terminal or output terminal of a system.

The central processing portion 103 includes a micro processor, ROM, RAM and the like in order to control entirely the input safety slave 1A. The data transmitting portion 104 is used to transmit control data which will be described later to the safety controller 2 through the network 3. In case of the I/O safety slave 1C, its data transmitting portion 104 is a data transmitting portion 104 having both functions for transmitting and receiving data. In case of the output safety slave 1B, it is a data transmitting portion 104 having data receiving function.

Figure 3:
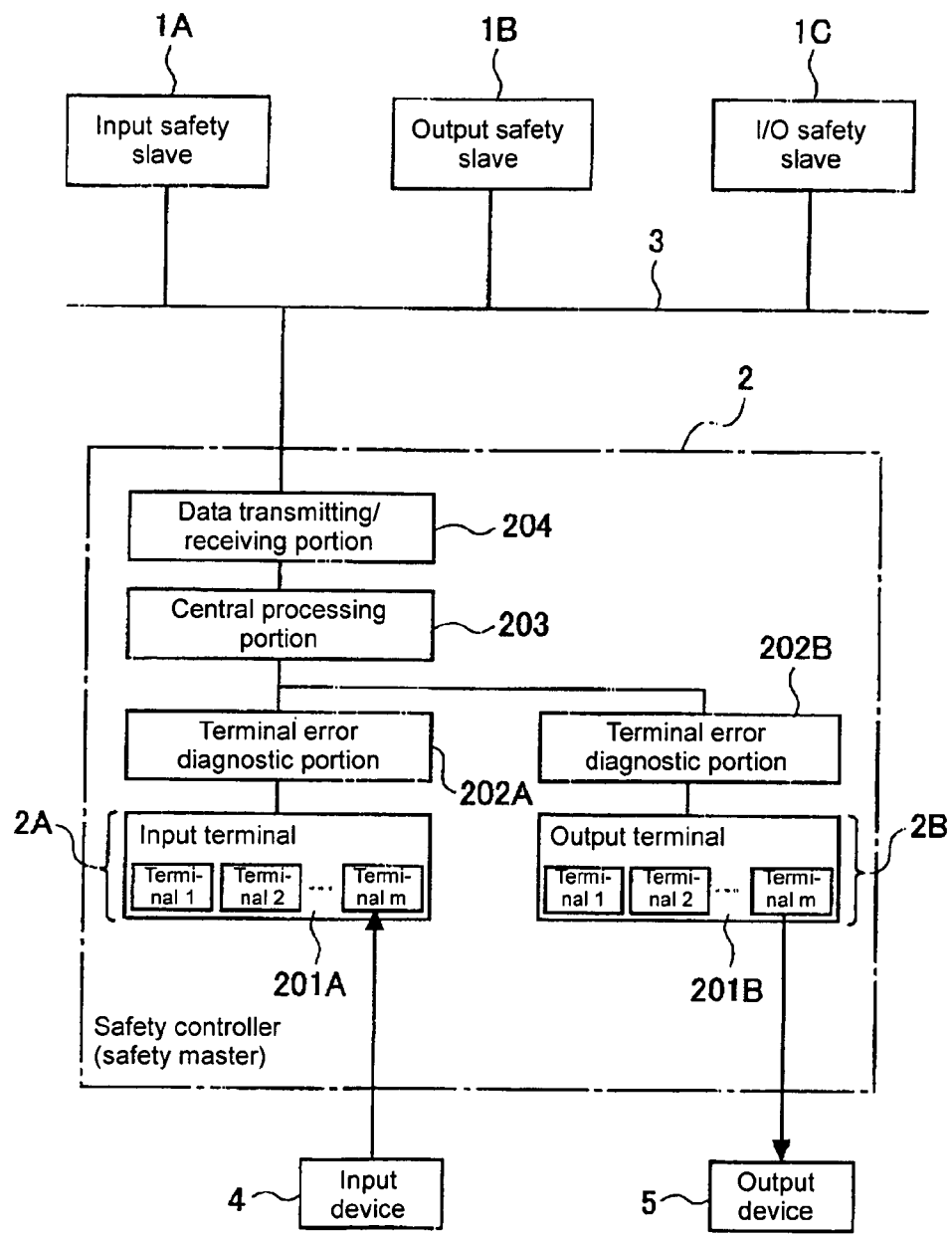
FIG. 3 is a block diagram showing internal hardware structure of the safety controller (safety master)

FIG. 3 shows a block diagram indicating the internal hardware structure of the safety controller 2. As indicated in the same Figure, the safety master 2 includes an input terminal portion 2A, a terminal error diagnostic portion 202A, an output terminal portion 2B, a terminal error diagnostic portion 202B, a central processing portion 203 and a data transmitting/receiving portion 204.

The input terminal portion 2A is provided with one or two or more input terminals (terminal 1, terminal 2, . . . terminal m) which is supplied with an input signal from the input device 4 designed on the safety specification.

The terminal error diagnostic portion 202A is used to diagnose for presence or absence of error in each input terminal (terminal 1, terminal 2, . . . terminal m) of the input terminal portion 2A and constituted of various kinds of error diagnostic circuits like the aforementioned safety slave. An object for error diagnosis is not only the input device 4 outside but also the input terminal portion 2A itself or other various kinds of matters. That is, this terminal error diagnostic portion 202A diagnoses whether or not any error exists in each input terminal by fetching in a self-diagnostic result of an input device corresponding to each terminal. It diagnoses each terminal individually about whether or not there is any abnormality in wiring between the input terminal and the input device. In conclusion, it diagnoses for a status of presence or absence of error for each terminal of a system.

The output terminal portion 2B is provided with one or two or more output terminals (terminal 1, terminal 2, . . . terminal m) which provides an output signal to the output device 5 designed based on the safety specification.

The terminal error diagnostic portion 202B is used to diagnose for presence or absence of an error in each output terminal (terminal 1, terminal 2, . . . terminal m of the output terminal portion 2B. If an output device corresponding to each terminal has self-diagnostic function, this terminal error diagnostic portion 202B fetches in each self-diagnosis result from each device so as to diagnose each output device for any error. Further, it diagnoses each terminal individually to see whether there is any error in wiring between the output terminal and output device. That is, it diagnoses each terminal of a system individually to check whether any error exists (status) like the input system. That is, the terminal error diagnostic portion on the safety slave side and the terminal error diagnostic portion on the safety controller side may be so constructed with the same function.

The central processing portion 203 is constituted of mainly a microprocessor for controlling the entire operation of the safety controller 2. It is provided with ROM, RAM (not shown) and the like externally. The central processing portion of the safety controller 2 includes logic operation function using user program, I/O control function connected to the safety controller, self-diagnostic function, and function for executing network communication with the input safety slave and the like. The data transmitting/receiving portion 204 is used to execute transmission/receiving of a specific communication protocol data among the input safety slave 1A, the output safety salve 1B and the I/O safety slave 1C.

Figure 4:
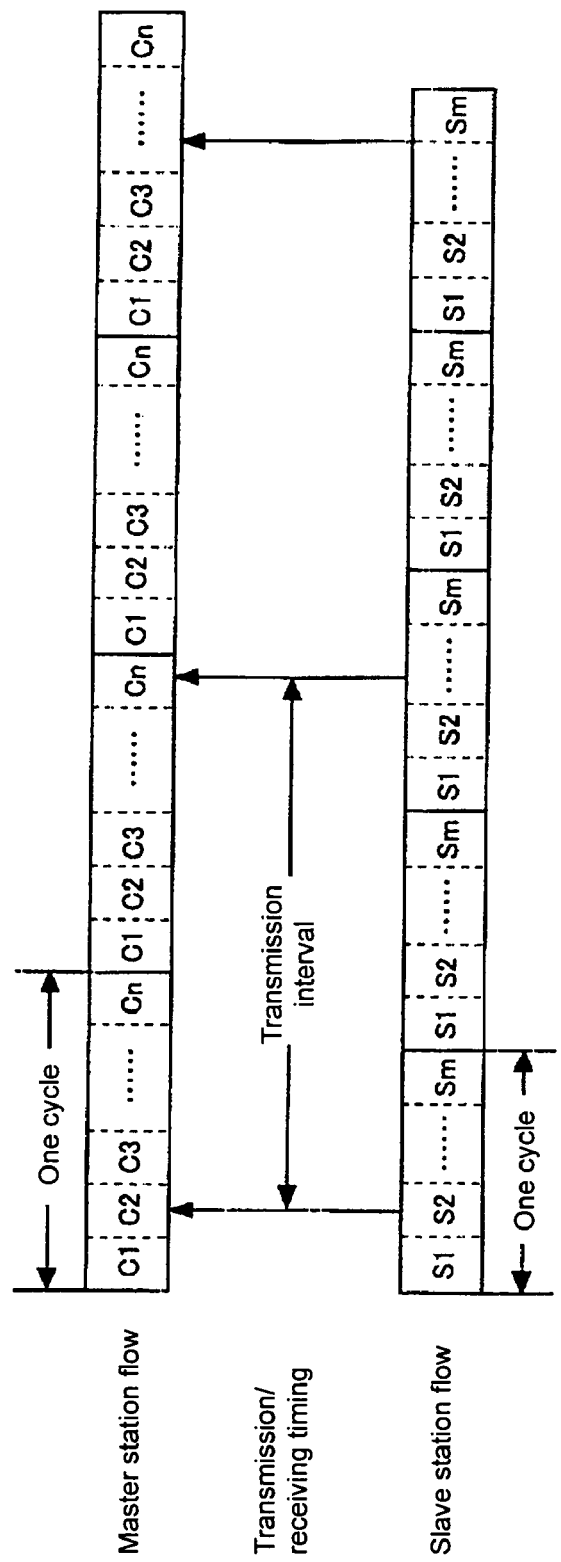
FIG. 4 is an explanatory diagram of communication timing between a master station and a slave station.

Next, an explanatory diagram of communication timing between the master station and the slave station is shown schematically in FIG. 4. As indicated in the same Figure, the master station and slave station have their own inherent control cycles and data is transmitted and received between these at a transmission timing asynchronous with a cycle of repeated execution of the safety controller 2. The safety controller side stores received data in a communication buffer (not shown) temporarily and refreshes its storage information in an operation data memory during the repeated execution. In this example, "control data" and "status data", which will be described later, are included in those data.

Figure 5:
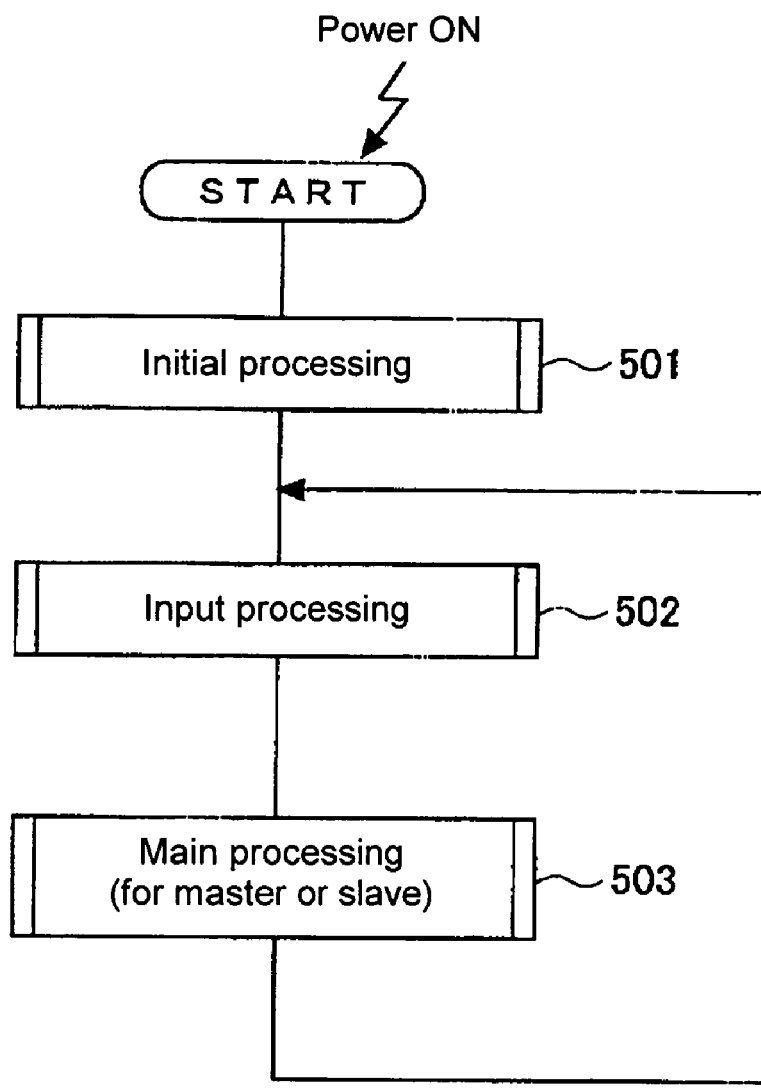
FIG. 5 is a general flow chart showing a processing content of the apparatus of the present invention.

Next, a general flow chart showing the processing content of the device of the present invention is shown in FIG. 5. The entire processing of the device of the invention is largely divided to initial processing to be executed just after power is turned on (step 501), input processing (step 502) to be executed as regular processing following the initial processing and main processing (step 503) to be executed following the input processing (step 503).

The content of the main processing (step 503) differs depending on whether the device of the present invention is achieved as the input safety slave 1A, the I/O safety slave 1C or safety controller safety master 2. In case of the safety slave 1, an action of inputting a signal from the input device corresponds to input processing. Then, an action of communicating to the communication master function of the safety controller 2, an action of outputting control data inputted by communication to the output device and an action of executing the self-diagnosis about each terminal correspond to the main processing. In case of the safety controller 2, an action of refreshing a signal from the input unit or the safety slave corresponds to the input processing and an action of outputting an operation result to the safety slave through logic operation processing and communication and an action of executing self-diagnosis correspond to the main processing.

Figure 6:
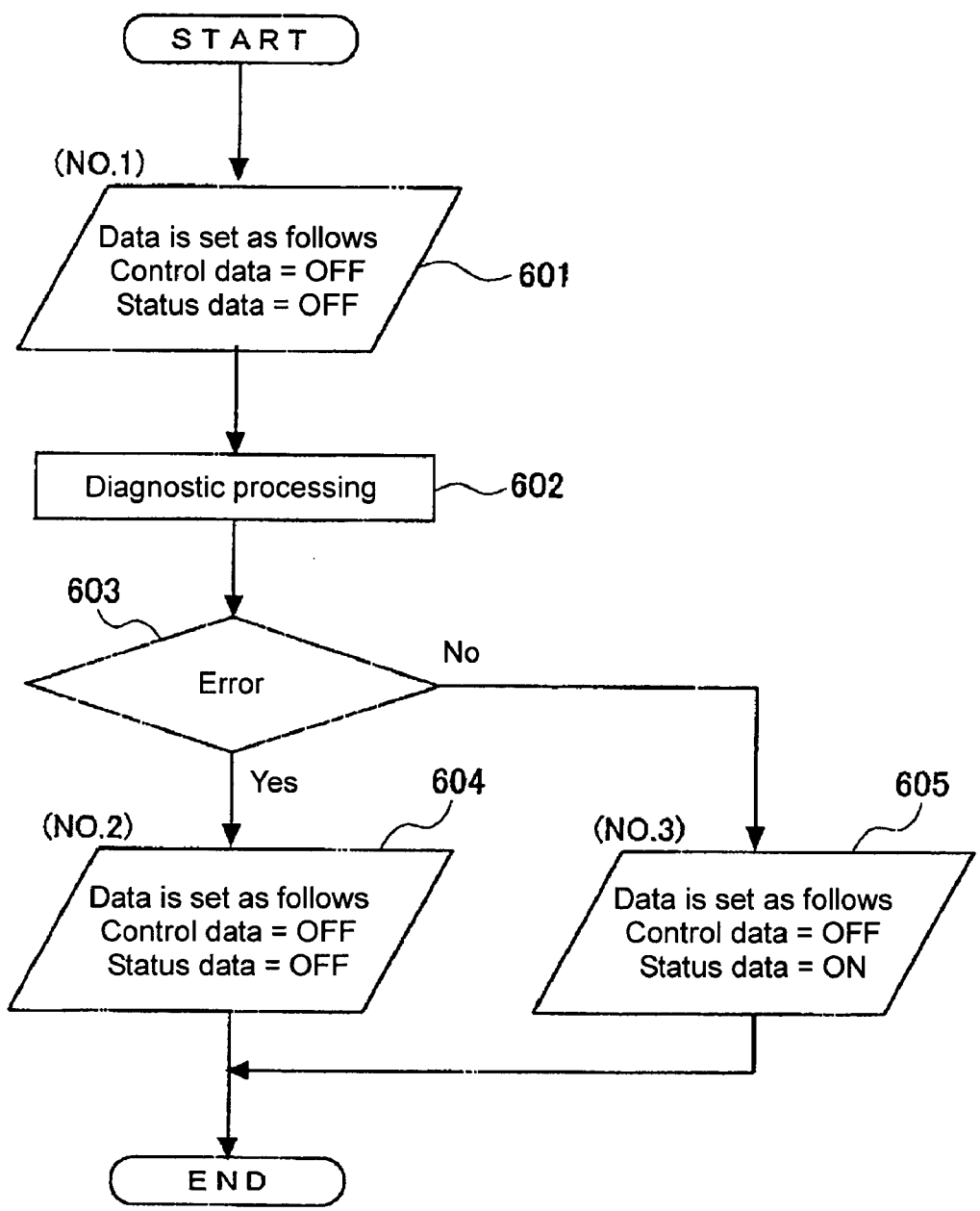
FIG. 6 is a flow chart showing the detail of initial processing.

Next, a flow chart indicating the detail of the initial processing of the central processing portion of the safety controller side is shown in FIG. 6. The initial processing of the central processing portion of the safety slave side is the same and takes the operation of the flow chart shown in FIG. 6. The description here is common to those. If the processing is started in the same Figure, in step 601, the initial setting with control data=OFF ("LOW") and status data=OFF ("LOW") is carried out for each terminal. This initial setting processing is carried out for all the terminals 101 equipped on the safety slave 1 and all the terminals 2A, 2B equipped on the safety controller 2 separately.

In a subsequent step 602, diagnostic processing of diagnosing for an error in each input terminal of the input terminal portion using the error diagnostic portion (terminal error diagnostic portion 102 in case of the safety slave and terminal error diagnostic portion 202A in case of the safety master) for each terminal separately is executed. As described previously, this error diagnostic processing diagnoses not only an error in the input device 4 but also an error in each terminal and a variety of errors.

In step 603, whether or not an error exists is determined based on a result of the diagnostic processing (step 602). If it is determined that an error exists, the procedure proceeds to step 604 and if it is determined that no error exists, the procedure proceeds to step 605.

In step 604, initial control data=OFF ("LOW") and status data=OFF ("LOW") is set for an input terminal determined to have an error. Status data=OFF means that an error exists. To the contrary, in step 605, initial control data=OFF ("LOW") and status data=ON ("HIGH") is set for an input terminal determined to have no error. Status data=ON means that no error exists.

As a result of executing the initial processing in this way, when a subsequent regular processing is started, the data status is OFF because each input device is not operated in the initial stage regardless of whether or not an error exits. Thus, the logical value of the control data is OFF ("LOW"). Whether or not an error exists in the input device and whether or not an error exists on wiring (short-circuit, disconnection and the like) are diagnosed for each terminal and the logical value of accompanying status data is set to OFF ("LOW") when an error exists and ON ("HIGH") when no error exists. Thus, a meaning of the logical value OFF ('LOW") of the control data just after the operation starts can be notified to a subsequent control by referring to the value of this status data. In case of the safety slave 1, initial control data concerning the ON/OFF operation of each input device and status data which is a diagnostic result of each input terminal can be transmitted in combination properly to the safety controller 2 as a transmission destination. In case of the input unit 2A of the safety controller, the control data and status data of each input terminal can be transmitted properly to the CPU unit of the safety controller 2 as a transmission destination.

Additionally, because "no error" corresponds to "HIGH" on a high energy side of the logical value of the status data, the status data does not indicates no error except when it is determined that no error exists as a result of the diagnostic processing (step 602), so that the status data indicates a high reliability.

Figure 7:
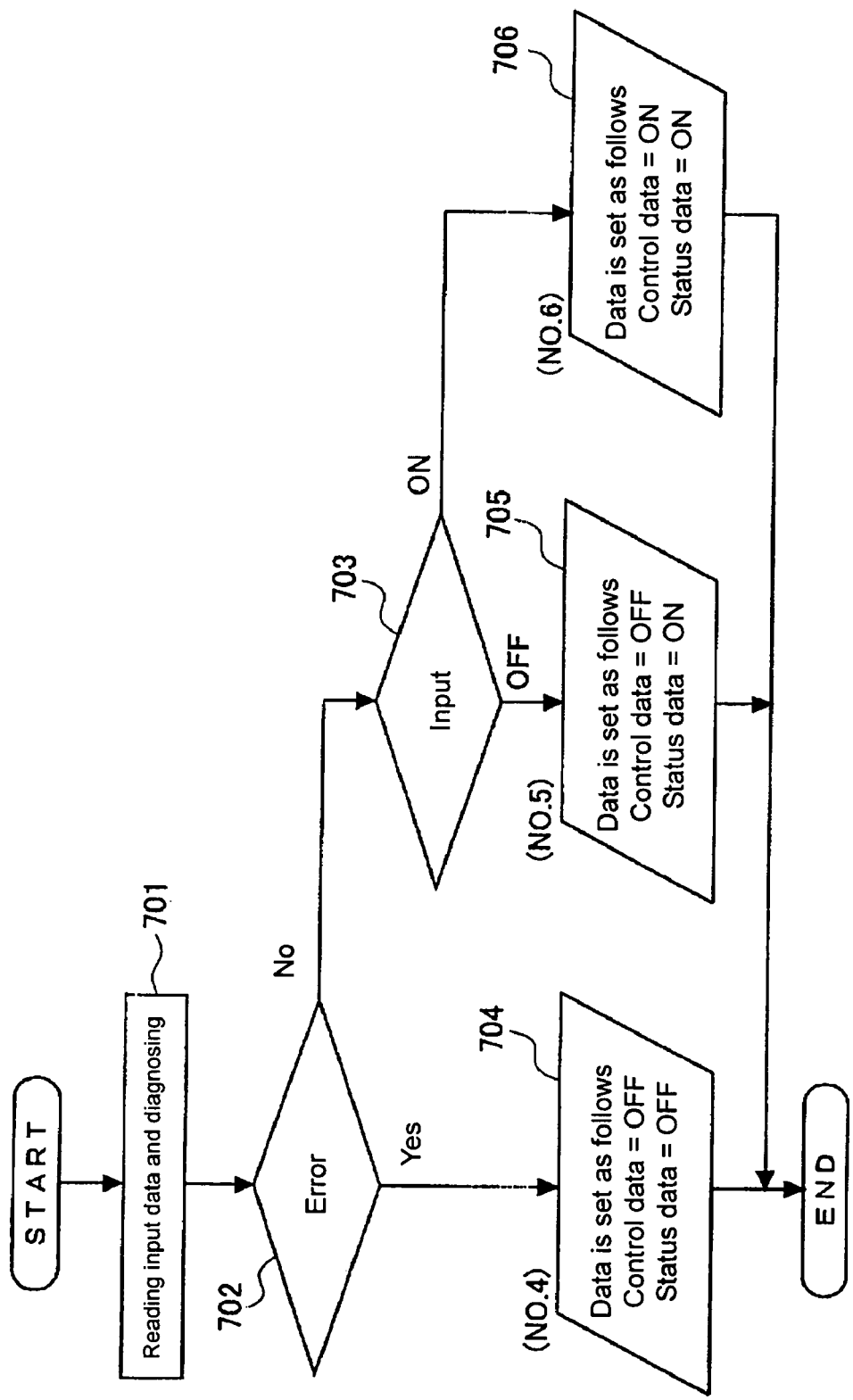
FIG. 7 is a flow chart showing the detail of input processing.

A flow chart indicating the detail of the input processing is shown in FIG. 7. This FIG. 7 indicates processing on the safety controller and processing on the safety slave. That is, both executes a common operation. When the processing is started in the same Figure, in step 701, reading of input data and diagnostic processing, which are actual operating condition of a connected input device, are executed. The content of this diagnostic processing is the same as the diagnostic processing (step 602) described with reference to FIG. 6 previously and whether or not an error exists is checked by inputting a signal of a result of the self-diagnosis on the input device side or whether or not an error exists on the wiring is diagnosed. Necessary operations are for the slave to input a signal of the result of the self-diagnosis performed by the input device connected to the slave and for the safety controller to input a signal of the result of the self-diagnosis performed by the input device connected to the safety controller. In the meantime, whether or not an error exists on the wiring is executed by the terminal error diagnostic portion 102 in case of the safety slave 1A and by the terminal error diagnostic portion 202A in case of the safety controller 2.

In step 702, whether or not an error exists is determined based on a result of the diagnostic processing. When the terminal error diagnostic portion 202A receives a self-diagnostic result signal of the input device side as an input or detects presence or absence of an error on the wring, the safety controller 2 determines that an error exists. When the terminal error diagnostic portion 102 detects that a self-diagnostic result signal on the input device side is inputted or an error exists on the wiring, the safety slave 1 determines that an error exixts. If it is determined that an error exists, the procedure proceeds to step 704 and if it is determined that no error exists, the procedure proceeds to step 703.

In step 704, control data=OFF ("LOW") and status data=OFF ("LOW") is set up. Control data=OFF ('LOW") means that the data status is turned OFF compulsorily as a result of diagnosing that an error exists and status data=OFF ("LOW") means that it is diagnosed that an error exists. In step 703, whether the logical value of an input signal in an actual operating condition read in from the input terminal is ON ("HIGH") or OFF ("LOW") is determined. Because each input device is not operated on the initial stage, their data statuses are all kept OFF and however, the ON/OFF status is determined based on actual operating condition or control condition of each input device after that. If it is determined that control data=OFF ("LOW"), the procedure proceeds to step 705 and if it is determined that control data=ON ("HIGH"), the procedure proceeds to step 706.

In step 705, control data=OFF ("LOW") and status data=ON ("HIGH") is set up. Status data=ON ("HIGH") means that it is diagnosed that no error exists and control data=OFF means that the operation and control conditions of the input device is OFF. To the contrary, control data=ON ("HIGH) and status data=ON ("HIGH") is set up in step 706. Status data=ON ("HIGH") means that it is diagnosed that no error exists and control data=ON ("HIGH") means that the actual operation and control conditions of the input device are ON. Steps 704, 705, 706 are executed by the central processing portion 103 in case of the safety slave 1A and by the central processing portion 203 in case of the safety controller 2.

In the above-described input processing, when a result of error diagnosis indicates no error, a raw logical value (that is, ON status and OFF status which are actual operation condition or control condition) given to the input terminal of the safety slave 1A or the safety controller 2 is reflected on the control data as it is. However, if the result of error diagnosis indicates that an error exists, the logical value of the control data of a corresponding device is set to "LOW" compulsorily regardless of the raw logical value given to the input terminal.

Additionally, individual control data for the input device obtained in this way is always provided with status data, which is an important point, and those control data are finally outputted in pair. In the meantime, the output mentioned here means that the data is stored in an appropriate buffer memory (not shown). As a result, it is possible to automatically distinguish which input terminal has an error while its control data is turned OFF compulsorily and which input terminal has no error while its control data is actually turned OFF.

Returning to the flow chart of FIG. 5, in the main processing (step 503), an inherent processing is executed depending on whether the device of the present invention is input safety slave 1A, I/O safety slave 1C or safety master 2 as described previously.

For example, if the device of the invention is achieved as the input safety slave 1A, in the main processing (step 503), the control data obtained in the input processing (step 502) and status data are transmitted to a predetermined transmission destination (for example, safety master 2) in pair. If the control data and status data are transmitted in pair, the safety master 2 which receives these can interpret the meaning of the control data based on the content of the status data attached to the control data.

More specifically, even if the logical value of the control data is OFF ("LOW"), whether that is a reflection of a raw input signal or caused by compulsory setting processing executed because an error occurs in the input terminal can be determined based on the logical value of the status data, thereby making it possible to take an appropriate action for restoration of the system.

In the meantime, the processing in case where the device of the present invention is I/O safety slave 1C is equal to the case of the input safety slave 1A described previously if speaking of its input only and therefore description thereof is omitted. In case of the I/O safety slave 1C and the output safety slave 1B, their output terminals may be provided with a structure for diagnosing for an error in the output device or an error (short-circuit, disconnection and the like) on the wiring connected to the output terminal. The control data and status data of each input terminal may be transmitted to a predetermined transmission destination in pair and at the same time, the status data of the output terminal may be transmitted separately. Because the output data of the output terminal is transmitted from the safety controller but not transmitted by the safety slave, it is transmitted separately without accompanying the output data.

On the other hand, in case where the device of the present invention is the safety controller (safety master) 2, as the main processing (step 503), an input signal obtained through the input unit 2A is converted to control data through input processing and then transmitted to the CPU unit of the other safety controller 2 (not shown) with the status data. After that, it will be understood easily by those skilled in the art that the original processing of the safety CPU unit (for example, user program execution processing) is executed after that.

In case where the device of the present invention is the safety controller 2, the control data and status data in pair may be transmitted to not only its own CPU unit but also other safety controller. Within the controller itself, the control data can be used for execution of user program after the content of the control data is certified based those, thereby improving the execution reliability of the user program. Of course, if the control data is transmitted to other safety controller also, it can be used for execution of the user program on the safety controller at that transmission destination thereby improving the execution reliability of the user program.

Figure 8:
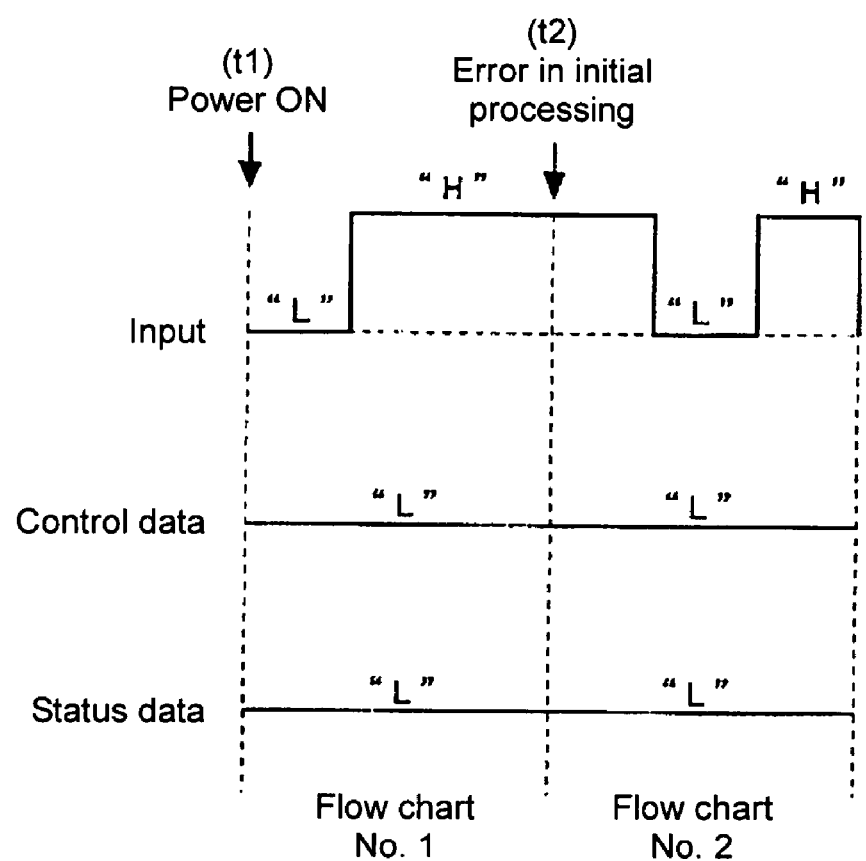
FIG. 8 is a time chart showing a status transition when it is determined that an error exist as a result of diagnosis at the initial processing (in case where the status is "HIGH"="normal")

Next, FIG. 8 shows a time chart showing the transition of state when it is diagnosed that an error exists in the diagnosis at the time of initial processing (case of status "HIGH"=normal). Flow chart No. 1 and flow chart No. 2 in the same Figure indicate corresponding numbers of the flow chart of FIG. 6.

If it is diagnosed that an error exists in the diagnosis at the time of the initial processing as indicated in the same Figure, the value of the control data is compulsorily maintained at "LOW" which is on the safety side regardless of what is the logical value of the raw input data and the value of the status data is compulsorily maintained at "HIGH" indicating that an error exists. Thus, the status data is never tuned to "HIGH" indicating a normal condition just after the power is turned ON.

Figure 9:
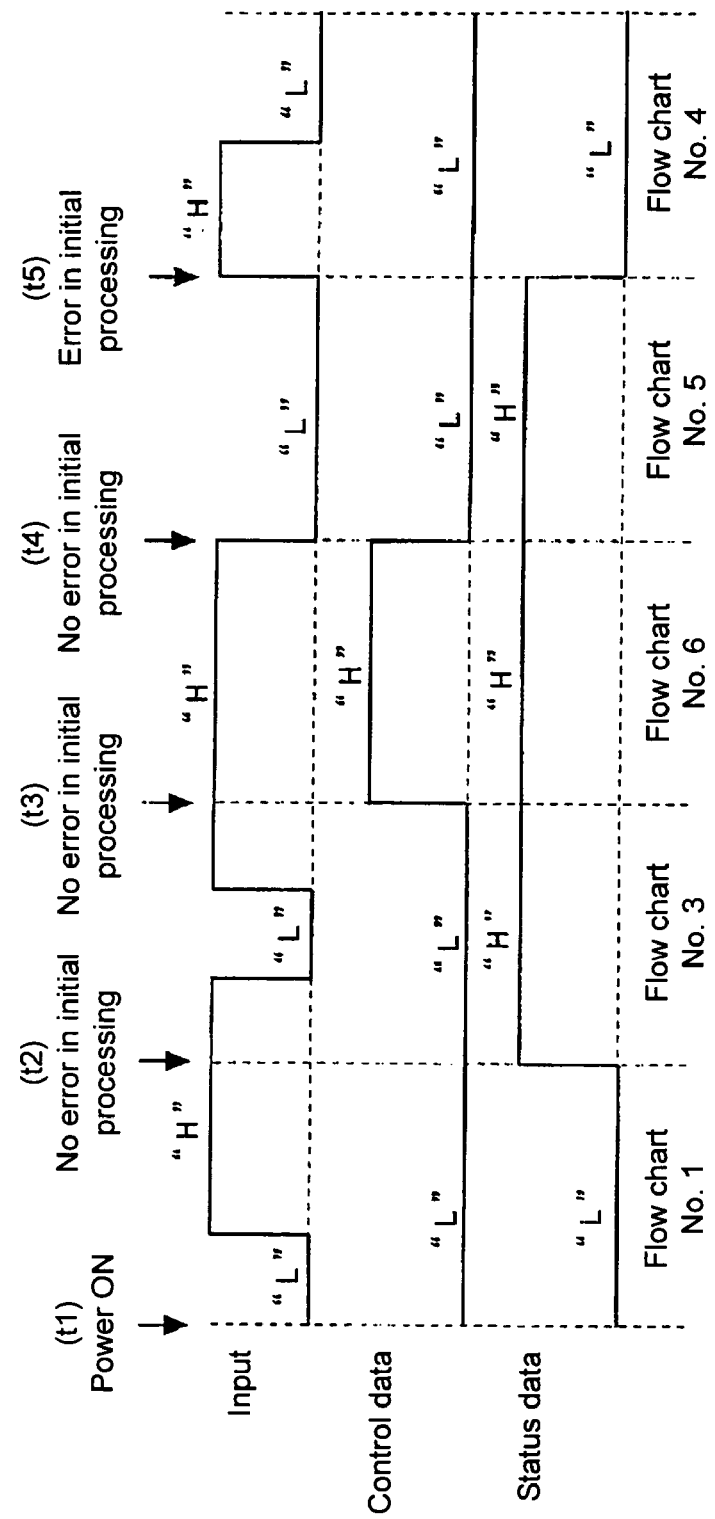
FIG. 9 is a time chart showing a status transition when it is determined that an error exist as a result of diagnosis after the operation is started (in case where the status is "HIGH"="normal")

Next, a time chart (in case where status "LOW"=normal) indicating the transition of status in case where it is diagnosed that an error exists in the diagnosis after the operation starts is shown in FIG. 9. In the meantime, flow chart No. 1, flow chart No. 3, flow chart No. 6, flow chart No. 5 and flow chart No. 4 in the same Figure indicate the relation with steps in FIGS. 7, 8.

If it is diagnosed that no error exists in the diagnosis after the operation starts as evident from the same Figure, the logical value of the control data changes corresponding to the logical value of the raw input data. To the contrary, the logical value of the status data is maintained in the state of "LOW" only in a period in which it is determined that no error exists. Thus, after the logical value of the control data is set to "LOW" compulsorily as a result of diagnosing that an error exists at time t5, the logical value of the status data is also "LOW" and thus, it is possible to confirm that this LOW is not produced by actual operation or control of the raw input data but it is set to "LOW" compulsorily as a result of diagnosing that an error exists at time t5 based on those two data. Additionally, according to this example, even if the control data is "LOW" just after the power is turned ON, it is possible to confirm that the error diagnostic processing about that control data has not been finished based on a fact that the status data is also "LOW".

Figure 10:
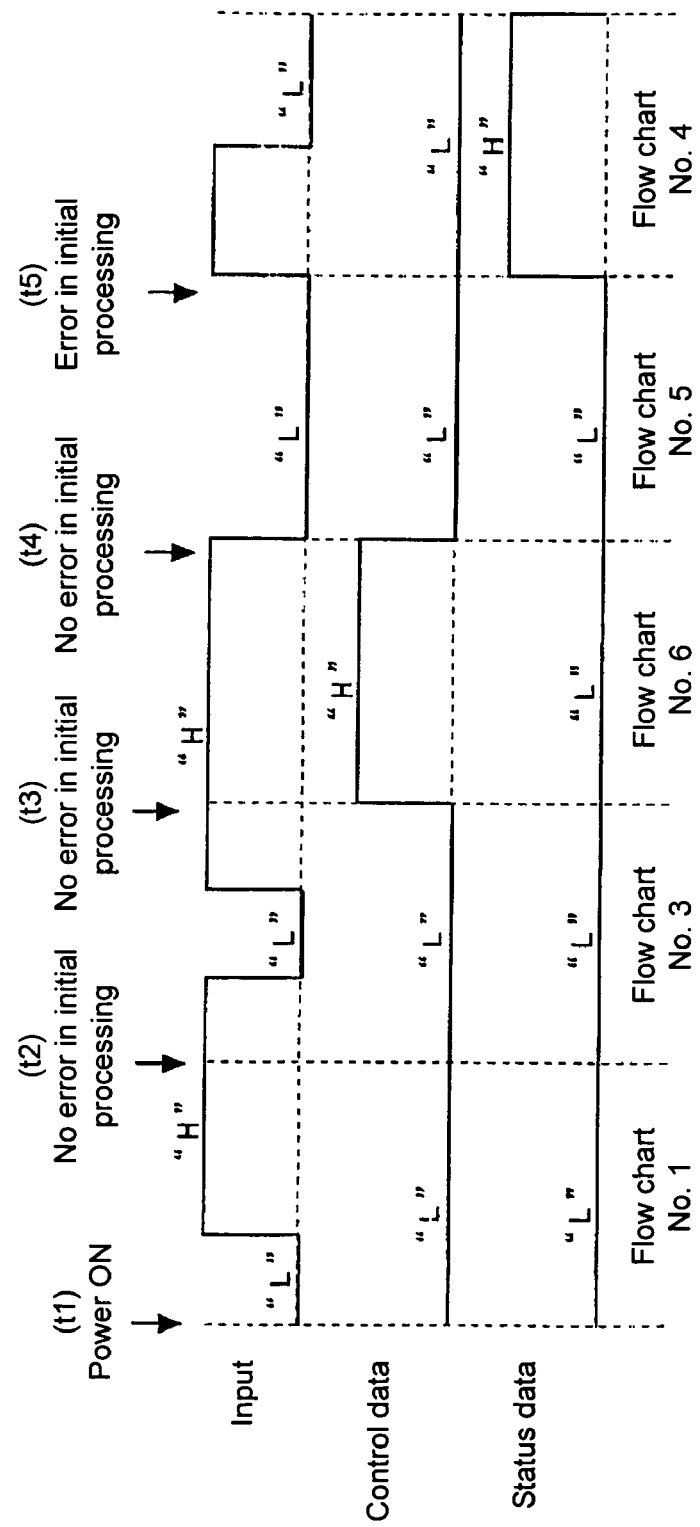
FIG. 10 is a time chart showing a status transition when it is determined that an error exist as a result of diagnosis after the operation is started (in case where the status is "LOW"="normal")
Figure 11:
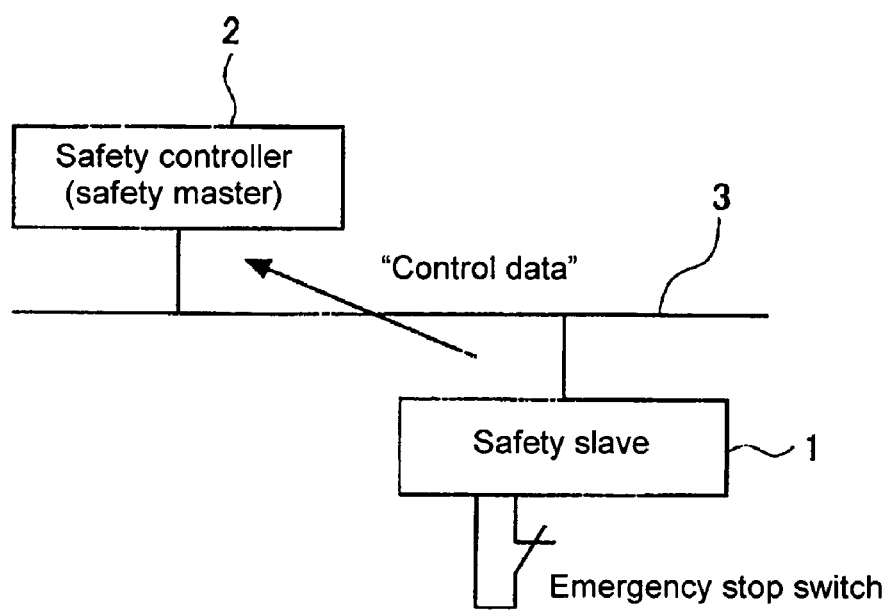
FIG. 11 is a diagram for explaining a problem in the master/slave type safety control system.

Next, a time chart indicating the transition of status when it is diagnosed that an error exists after the operation starts (case where status "HIGH"=normal) is shown in FIG. 10.

As indicated in the same Figure, according to this example, the status data is maintained at "LOW" regardless of around time t2 when it is diagnosed that no error exists in the initial processing and thus, whether or not the control data "LOW" just after the power is turned ON has undergone diagnosis for an error cannot be determined. In this point, the reliability of the control data can be said to be low.

As described previously, the safety control system of this embodiment is constituted by combining the safety controller 2 which functions as the safety master and the remote safety unit (1A, 1C) which functions as the safety slave through the network 3.

The remote safety unit (1A, 1C) comprises an input terminal portion 101 having one or two or more input terminals (terminal 1, terminal 2, ... terminal m) supplied with an input signal from the input device 4 based on the safety specification, a terminal error diagnostic portion 102 used for diagnosing for presence or absence of an error in each input terminal (terminal 1, terminal 2, ... terminal m) of the input terminal portion 101, an error diagnostic device (steps 602, 701) for diagnosing for presence or absence of an error in each input terminal of the input terminal portion using the terminal error diagnostic portion 102, an input device (steps 701-706) having a function of converting an input signal having a raw logical value provided to each input terminal of the input terminal portion to control data having a logical value whose safety is guaranteed with reference to a result of error diagnosis by the error diagnostic device and outputting the control data obtained by that conversion in pair with the status data indicating the result of the error diagnosis referred to upon the conversion and a transmitting device (data transmitting portion 104) having a function of transmitting the control data obtained from the input device and the status data making a pair therewith to the network.

On the other hand, the safety controller 2 includes a receiving device (data transmitting/receiving portion 204) for receiving the control data and the status data making a pair therewith from the network 3 and an input data reproducing device (step 503) for reproducing the input data based on the status data making a pair with the control data and processing it.

With such a structure, the remote safety unit (1A, 1C) is provided with a transmitting device having a function of transmitting the control data obtained from the input device and the status data making a pair therewith and the safety controller 2 is provided with a receiving device for receiving the control data and the status data making a pair therewith from the network 3 and an input data reproducing device for reproducing the input data based on the control data and the status data making a pair therewith. Thus, the safety controller 2 can makes an effective use of a result of diagnosis on the remote safety unit 1 thereby achieving a more reliable safety control.

The present invention enables an error diagnosis result referred to by the safety units such as this kind of the safety master and safety slave in a process of input processing of generating the control data from the raw input signal to be referred to by the side using the control data also, so that a variety of the safety controls based on the control data can be achieved.

What is claimed is:

1. A safety slave unit that with a plurality of input devices based on a safety specification and activated when a danger exists connected thereto, receives input signals about the presence or absence of activation from the input devices, and is connected to a safety controller based on the safety specification through a network so as to transmit the input signals to a communication master of the safety controller, comprising:

an input terminal portion having a plurality of input terminals for receiving the input signals from said input devices;

an error diagnostic portion that diagnoses an error of breaking or short circuit of wirings between each of said plurality of input terminals and said input devices, and sets a logical value "High" as a diagnosis status data upon the absence of the error and sets a logical value "Low" upon the presence of the error; and a processing means that forces to change the logical value of an actual input signal representing the presence or absence of activation received from each of said input terminals to a logical value corresponding to the presence of activation when the diagnosis status data of the input terminal corresponding to said actual input signal is a logical Low, allows the logical value of an actual input signal to remain when the diagnosis status data of the input terminal corresponding to said actual input signal is a logical High, and transmits to said communication master of said safety controller a pair of said logical values of the actual input signal and the corresponding diagnosis status data wherein the logical value of said actual input signal is regarded as a logical value of a control data of each of the corresponding input devices.

2. A control system in which a safety controller based on a safety specification having fail safe functions and a communication master portion and a safety slave unit based on a safety application are connected through a network, wherein the safety slave unit comprising:

an input terminal portion having a plurality of input terminals for receiving input signals about the presence or absence of activation from a plurality of input devices connected thereto, the input devices being activated when a danger exists;

an error diagnostic portion that diagnoses an error of breaking or short circuit of wirings between each of said plurality of input terminals and said input devices, and sets a logical value "High" as a diagnosis status data upon the absence of the error and sets a logical value "Low" upon the presence of the error; and a processing means that forces to change the logical value of an actual input signal representing the presence or absence of activation received from each of said input terminals to a logical value corresponding to the presence of activation when the diagnosis status data of the input terminal corresponding to said actual input signal is a logical Low, allows the logical value of an actual input signal to remain when the diagnosis status data of the input terminal corresponding to said actual input signal is a logical High, and transmits to said communication master of said safety controller a pair of said logical values of the actual input signal and the corresponding diagnosis status data wherein the logical value of said actual input signal is regarded as a logical value of a control data of each of the corresponding input devices, and wherein the safety controller receives said pair of logical values from said safety slave unit through said communication master portion, and when the logical value of the received control data indicates the presence of an activation, determines per each of said input devices that the activation originates from the logical value of an actual input signal representing the presence of the activation with the corresponding diagnosis logical value set to a logical High, or from the logical value of an input signal forcibly changed by said processing means with the corresponding diagnosis logical value set to a logical Low.

3. A safety controller including a CPU unit and an input unit connected through an internal data bus to said CPU, wherein the input unit is connected to a plurality of input devices based on a safety specification and activated when a danger exists, and is adaptive to receive input signals about the presence or absence of an activation from the input devices, and the CPU unit feeds input signals of the input unit and executes safety logic control based on the input signals, wherein the input unit includes:

an input terminal portion having a plurality of input terminals for receiving input signals about the presence or absence of activation from the input devices based on the safety specification;

an error diagnostic portion that diagnoses an error of breaking or short circuit of wirings between each of said plurality of input terminals and said input devices, and sets a logical value "High" as a diagnosis status data upon the absence of the error and sets a logical value "Low" upon the presence of the error; and a processing means that forces to change the logical value of an actual input signal representing the presence or absence of activation received from each of said input terminals to a logical value corresponding to the presence of activation when the diagnosis status data of the input terminal corresponding to said actual input signal is a logical Low, allows the logical value of an actual input signal to remain when the diagnosis status data of the input terminal corresponding to said actual input signal is a logical High, and transmits to the CPU unit through the internal bus a pair of said logical values of the actual input signal and the corresponding diagnosis status data wherein the logical value of said actual input signal is regarded as a logical value of a control data of each of the corresponding input devices, and the CPU unit includes a central processing portion that receives said pair of logical values inputted from the input unit, and when the logical value of the inputted control data indicates the presence of an activation, determines per each of said input devices that the activation originates from the logical value of an actual input signal representing the presence of the activation with the corresponding diagnosis logical value set to a logical High, or from the logical value of an input signal forcibly changed by said processing means with the corresponding diagnosis logical valve set to a logical Low.

* * * * *